United States Patent
Munjal et al.

(10) Patent No.: US 11,733,997 B2
(45) Date of Patent: Aug. 22, 2023

(54) CODE CHANGE REQUEST ANALYSIS AND PRIORITIZATION TOOL

(71) Applicant: CERNER INNOVATION, INC., Kansas City, KS (US)

(72) Inventors: Arpit Munjal, Jaipur (IN); Guru Shankar, Bangalore (IN); Pramod Kumar Deshpande, Bangalore (IN); Puneeth Revankar, Shimoga (IN); Solomon Bhanu Prakash Nukathoti, Guntur (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

(21) Appl. No.: 17/404,447

(22) Filed: Aug. 17, 2021

(65) Prior Publication Data
US 2023/0058237 A1   Feb. 23, 2023

(51) Int. Cl.
G06F 8/70 (2018.01)
G06F 11/07 (2006.01)
G06F 3/0482 (2013.01)

(52) U.S. Cl.
CPC ............. *G06F 8/70* (2013.01); *G06F 11/07* (2013.01); *G06F 11/079* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 7,516,438 B1 | 4/2009 | Leonard et al. | |
| 8,352,914 B2 | 1/2013 | Sarkar et al. | |
| 11,157,390 B2* | 10/2021 | Acharyya | G06F 11/3624 |
| 2012/0167060 A1* | 6/2012 | Landwehr | G06F 11/3604 717/131 |
| 2015/0019564 A1* | 1/2015 | Higginson | G06F 8/65 707/748 |
| 2018/0276103 A1* | 9/2018 | Woulfe | G06F 8/75 |
| 2021/0142258 A1* | 5/2021 | Noivo | G06F 11/3608 |
| 2022/0237025 A1* | 7/2022 | Bregman | G06F 9/5083 |

* cited by examiner

*Primary Examiner* — Duy Khuong T Nguyen
*Assistant Examiner* — Mark A Gooray
(74) *Attorney, Agent, or Firm* — Invoke

(57) ABSTRACT

A code change request prioritization tool that uses weighting values specific to pre-determined factors to concurrently calculate a total weighted prioritization score, is disclosed. The total weighted prioritization score may be calculated using a percentile score for factors as inputs in the calculation. Once a solution is found for a highest priority code change request, similar code defects may be identified so as to provide solutions to all similar defects, simultaneously.

20 Claims, 10 Drawing Sheets

| | SEVERITY | SEVERITY_LEVEL |
|---|---|---|
| 302 | NULL | 1 |
| 304 | N/A | 1 |
| 306 | 4-Minor Error | 2 |
| 308 | Cosmetic | 3 |
| 310 | Patient Care | 4 |
| 312 | Performance | 4 |
| 314 | Technical | 4 |
| 316 | Functional | 4 |
| 318 | Outage | 5 |
| 320 | Data Loss | 5 |
| 322 | Financial | 5 |

FIG. 3

| TICKET CRITICALITY | CRITICALITY_LEVEL |
|---|---|
| Critical | 8 |
| High | 5 |
| Medium | 3 |
| Low | 2 |

CODE CHANGE REQUEST ANALYSIS AND PRIORITIZATION TOOL

BACKGROUND

Some development teams support hundreds of clients that have domains operating with different code bases. With such support comes a potential for a large number of diverse electronic requests to modify any one of the hundreds of lines of code in any of the hundreds of code bases. Current solutions involve merely handling each electronic code change request in a sequence in which it was received, independent of the magnitude of the code change, for example. More often, current solutions are a resource intensive process that overtaxes valuable processing power, reduces available memory space, and degrades computer optimizations. As such, there is a need for a new solution that reduces processing time, increases processing power, and optimizes computer functions across all of the code bases.

Further, since the current solutions handle each electronic code change request in the sequence they are received, the current solutions address each code change request individually such that, in some instances, the exact same code modification is made multiple times in various locations within the same code due to redundant code change requests being received at different times.

SUMMARY

Systems, methods, and computer-readable media are provided for implementing a prioritization support tool for prioritization and analysis of code change requests. In particular, a code change request prioritization system is provided for determining prioritization ranking order for each of a plurality of code change requests received. Embodiments of the present disclosure described herein may provide a total weighted percentile score using a plurality of factors for each code change request.

In embodiments, a plurality of code change requests is received. Each of the plurality of code change requests is associated with one or more code bases. A total weighted percentile score is concurrently determined for each of the plurality of code change requests. Each of the weighted percentile scores is determined using a plurality of factors. The weighted percentile score indicates a code defect impact. The system identifies one code change request which has a highest weighted percentile score. The one code change request with a highest weighted percentile score is associated with one code base. A set of logic may be utilized to detect one or more groups of code base changes that are identified as similar code change requests. In some embodiments, the characteristics of the plurality of code change requests and prioritization factors may be input into one or more machine learning models that are trained to identify similar code change request. These similar code change requests may be resolved by opening the code base a single time. For example, the code base may be opened and the solutions for each of the similar code change requests may be implemented into the code base at the same time.

In further embodiments, a plurality of code change requests may be received which all identify the same code change request. After a solution is identified for the code change request, all submissions for that code change request are resolved for multiple code bases simultaneously. For example, one solution to the code change request may also be a solution for multiple received requests to change a code defect, for simultaneous resolution.

BRIEF DESCRIPTION OF THE DRAWINGS

The present disclosure is described in detail below with reference to the attached drawing figures, wherein:

FIG. 3 illustrates a table that provides examples of severity factors usable in calculating a percentile score, according to an aspect of the present disclosure;

FIG. 4 illustrates a table that provides examples of levels of ticket criticality usable in calculating a percentile score, according to an aspect of the present disclosure;

DETAILED DESCRIPTION

Figure 1A:
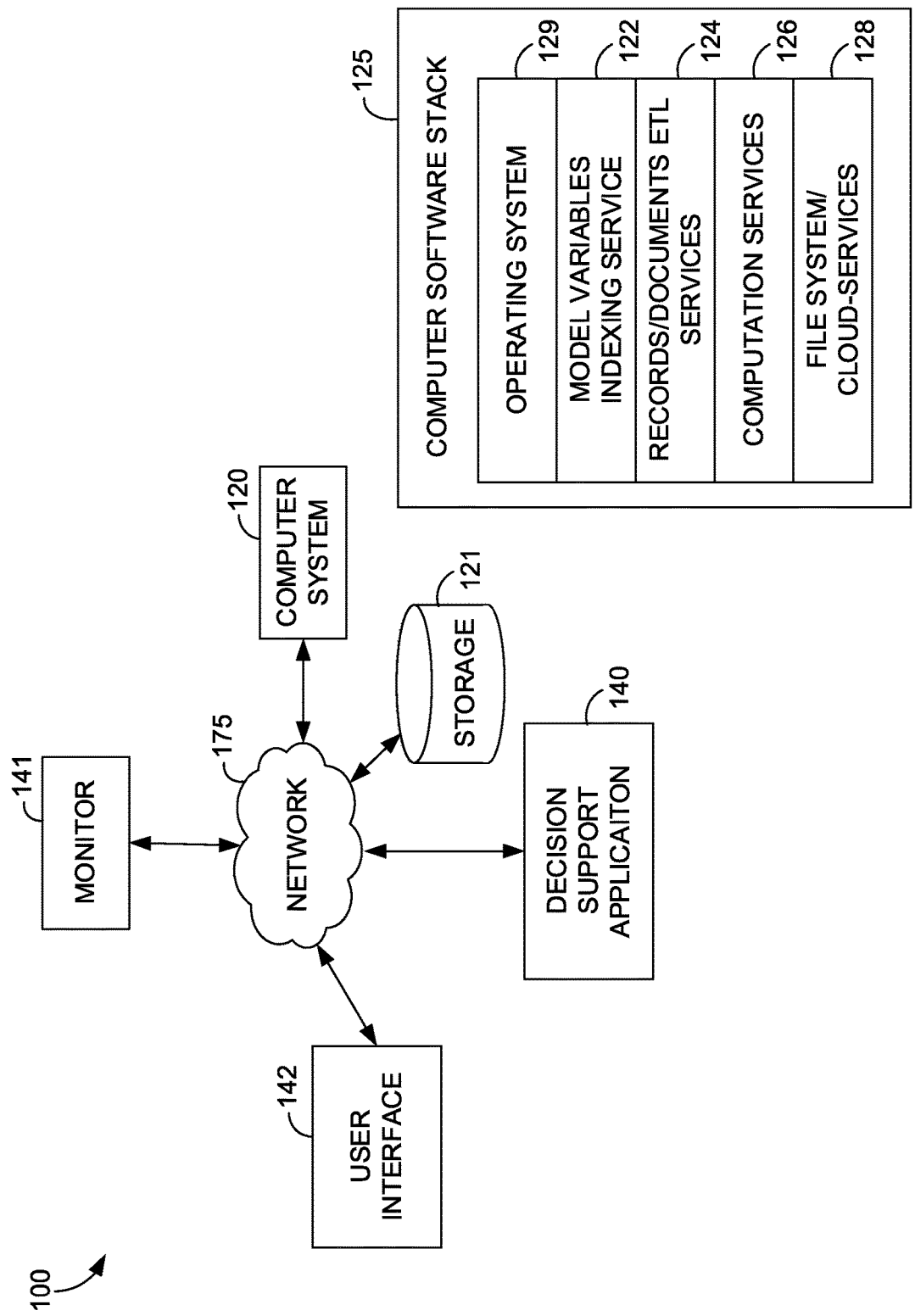
FIG. 1A and FIG. 1B illustrates aspects of an example operating environment suitable for practicing an embodiment of the present disclosure.

The subject matter of the present disclosure is described with specificity herein to meet statutory requirements. However, the description itself is not intended to limit the scope of the present disclosure. Rather, the inventors have contemplated that the claimed subject matter may also be embodied in other ways, to include different steps or combinations of steps similar to the ones described in the present disclosure, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As one skilled in the art will appreciate, embodiments of the present disclosure may be embodied as, among other things: a method, a system, or a set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media, as discussed further with respect to FIG. 1A and FIG. 1B.

Accordingly, at a high level, this disclosure describes, among other things, methods and systems for providing prioritization support during analysis of code change requests and assists in the quick and effective resolution of those code change requests. As used herein, the term "code change requests" refers to requests submitted to resolve an issue in a software product. Many software products may be implemented using customized and unique code bases and as such, a large number of code change requests are likely to be received for such a plurality of software products. Additionally, the software product(s) implemented using the varied code bases (e.g., customized for different entities, service, and/or downstream applications) may be customized between different operating systems, different network connection, and/or different computing devices, which the code inside each code base reflects.

None of the currently available systems allow for a plurality of code change requests to be prioritized based on a plurality of factors. Each request is reviewed consecutively, or in the order in which it is received. Further, in many available systems, there is no indication of whether one code change request may address a more severe code defect than another, for example. To combat the problems with code change request management and monitoring, including the processing, memory, and computer function concerns discussed prior, it is important to accurately and promptly identify the impact a solution for each code change request is predicted to have on the function of the code base. In other words, addressing and resolving some code change requests may cure severe code base malfunctions and/or may cure degraded code base performance, while other code change requests may resolve a (relatively minor) user interface error. As such, determining the technological impact and code base performance improvements that are predicted for each code change request relative to others is utilized by embodiments herein to overcome and address the technological limitations of current systems, as prioritization schema.

Additionally, multiple code change requests likely exist for the same code base, and thus the code base would need to be opened multiple times to correct each of the code change requests, which is a technological shortcoming found in other systems. A single solution identified for a code change request is not identified as solving multiple submissions across multiple code bases in current systems. Embodiments herein address and overcome this technological limitation. Specifically, when code change requests are prioritized and a solution is identified for the highest priority request by way of embodiments herein, the code base that corresponds to the highest priority request is opened and the error is fixed. Further, the code modification or "fix" can be implemented across multiple code bases and/or implemented in multiple instances within that particular code base. By implementing a code change in multiple instances and/or in multiple code bases, a single high priority code change request is used to cure multiple tickets that relate to the same code defect impairing the code base and/or degrading performance (independent of the sequence in which the code change request was received.)

Accordingly, in embodiments, a plurality of code change requests are received. Each of the plurality of code change requests is associated with one or more code bases. A total weighted percentile score is concurrently determined for each of the plurality of code change requests. Each of the weighted percentile scores is determined using a plurality of factors. The weighted percentile score indicates a code defect impact. The system identifies one code change request which has a highest weighted percentile score. This one code change request with a highest weighted percentile score is associated with one code base. A set of logic may be utilized to detect one or more groups of code base changes that are identified as similar code change requests.

In some embodiments, the characteristics of the plurality of code change requests and prioritization factors may be input into one or more machine learning models that are trained to identify similar code change request. These similar code change requests may be resolved by opening the code base a single time. For example, a code base may be opened and the solutions for each of the similar code change requests may be implemented into the code base at the same time.

In further embodiments, a plurality of code change requests may be received which all identify the same code change request. After a solution is identified for the code change request, all submissions for that code change request are resolved for multiple code bases simultaneously. For example, a solution to a code change request may provide a resolution for multiple received requests to change a code defect and may be solved simultaneously.

Referring now to the drawings generally and, more specifically, referring to FIG. 1A, an operating environment 100 is provided suitable for practicing an embodiment of the present disclosure. Certain items in block diagram form are shown more for being able to reference something consistent with the nature of a patent than to imply that a certain component is or is not part of a certain device. Similarly, although some items are depicted in the singular form, plural items are contemplated as well (e.g., what is shown as one data store might really be multiple data-stores distributed across multiple locations). But showing every variation of each item might obscure aspects of the present disclosure. Thus, for readability, items are shown and referenced in the singular (while fully contemplating, where applicable, the plural).

As shown in FIG. 1A, example operating environment 100 provides an aspect of a computerized system for compiling and/or running an embodiment of a code change request analysis and prioritization application or "tool." Operating environment 100 includes one or more client systems, such as client system 144, communicatively coupled to network 175, which is communicatively coupled to computer system 120. In some embodiments, components of operating environment 100 that are shown as distinct components may be embodied as part of or within other components of operating environment 100. For example, client system 144 may comprise one or more client systems, such as a plurality of systems monitored and managed via the application 140.

Network 175 may comprise the Internet, and/or one or more public networks, private networks, other communications networks, such as a cellular network, or a similar network for facilitating communication among devices connected through the network 175. In some embodiments, network 175 may be determined based on factors, such as the source and destination of the information communicated over network 175, the path between the source and destination, or the nature of the information. For example, intra-organization or internal communication may use a private network or virtual private network (VPN). Moreover, in some embodiments, items shown as being communicatively coupled to network 175 may be directly communicatively coupled to other items shown communicatively coupled to network 175.

In some embodiments, operating environment 100 may include a firewall (not shown) between a first component and network 175. In such embodiments, the firewall may reside on a second component located between the first component and network 175, such as on a server (not shown), or reside on another component within network 175, or may reside on or as part of the first component.

Example operating environment 100 further includes a user interface 142 communicatively coupled through network 175, to application 140, and client system 144. Although operating environment 100 depicts an indirect communicative coupling between user interface 142, and application 140, and client system 144 through network 175, it is contemplated that, in an embodiment, of user interface 142 is communicatively coupled to application 140 and client system 144 directly. An embodiment of user interface 142 takes the form of a graphical user interface (discussed in FIG. 5 through FIG. 6D) operated by a software application or set of applications (e.g., application 140) on a computing device. A healthcare provider application may facilitate accessing and receiving information from a user or a healthcare provider about a specific software program or code base for the specific software program and for which the code change request is identified according to the embodiments presented herein. Embodiments of user interface 142 also facilitate accessing and receiving information from a client system 144 about a specific code base or code change request, for example. In an embodiment, user interface 142 also facilitates providing solutions to change requests and monitoring status and prioritization of code change requests.

An embodiment of application 140 comprises a software application or set of applications (which may include programs, routines, functions, or computer-performed services) residing on a computing device, on one or more servers in the cloud, or distributed in the cloud and on a computing device such as a personal computer, laptop, smartphone, tablet, mobile computing device, front-end terminals in communication with back-end computing systems or other computing device(s) such as computer system 120 described below. In an embodiment, application 140 includes a Web-based application or applet (or set of applications) usable to provide or manage user services provided by an embodiment of the present disclosure. For example, in an embodiment, application 140 facilitates processing, interpreting, accessing, storing, retrieving, and communicating information acquired from monitor 141, or storage 121, or client system 144. In some embodiments, application 140 includes or is incorporated into a code change request prioritization and analysis tool, as described herein. Further, some embodiments of application 140 utilize user interface 142.

In some embodiments, application 140 and/or user interface 142 facilitates accessing and receiving information from a client system 144 or storage 121 about a specific code change request, a code base, or client software system according to the embodiments presented herein. Application 140 and/or user interface 142 also facilitates the display of a prioritization schema for a plurality of code changes requests for various code bases and solution recommendations for curing code defects to maximize software performance, for example. In an embodiment, application 140 accesses a plurality of diverse code bases for various software produces, prioritizes code change requests as further discussed in detail below, monitors user queries related to code bases and/or code change requests, and causes the user interface 142 to present related information.

Monitor 141 stores user-derived data locally or communicates data over network 175 to be stored remotely, in embodiments. In an embodiment, application 140, or the computer system 120 it is operating on, is wirelessly communicatively coupled to monitor 141. Application 140 may be embodied as a software application operating on a user's mobile device, as described above. In an embodiment, application 140 and monitor 141 are functional components of the same device, such as a device comprising a sensor, one or more other applications, and a display component.

Example operating environment 100 further includes computer system 120, which may take the form of a server, which is communicatively coupled, through network 175, to application 140 and storage 121. Computer system 120 comprises one or more processors operable to receive instructions and process them accordingly and may be embodied as a single computing device or multiple computing devices communicatively coupled to each other. In one embodiment, processing actions performed by computer system 120 are distributed among multiple locations, such as one or more local clients and one or more remote servers, and may be distributed across the other components of example operating environment 100. In one embodiment, computer system 120 comprises one or more computing devices, such as a server, desktop computer, laptop, or tablet, cloud-computing device or distributed computing architecture, a portable computing device, such as a laptop, tablet, ultra-mobile PC, or a mobile phone.

Embodiments of computer system 120 include computer software stack 125, which, in some embodiments, operates in the cloud as a distributed system on a virtualization layer within computer system 120, and includes operating system 129. Operating system 129 may be implemented as a platform in the cloud and is capable of hosting a number of services such as model variables indexing service 122, records/documents extract, transform, and load (ETL) service 124, computation services 126, and cloud-services 128, described further herein. Some embodiments of operating system 129 comprise a distributed adaptive agent operating system. Embodiments of services, such as those above, run as a local or distributed stack in the cloud, on one or more personal computers or servers, such as computer system 120, and/or a computing device running user interface 142 and/or application 140. In some embodiments, user interface 142 and/or application 140 operates in conjunction with computer software stack 125.

In embodiments, model variables indexing service 122 facilitates retrieving frequent item sets, extracting database records, and cleaning the values of variables in records. For example, model variables indexing service 122 may perform functions for synonymic discovery or indexing or mapping variables in records. In some embodiments, model variables indexing service 122 may invoke computation services 126. Computation services 126 perform statistical software operations, such as computing the transformed variable predictions, transferred features (such as log and log 1p functions of features), and severity indices, as described herein. Computation services 126 also may include natural language processing services (not shown) or similar services. Computation services 126 also may include services or routines for utilizing sequential modeling using one or more models, including decision trees and logistic models, for determining prioritization of code change requests and determining similar code change requests, such as the models described in connection to FIG. 2 to FIG. 6D.

In some embodiments, computer software stack 125 includes file system/cloud-services 128. Additionally, some embodiments of file system/cloud-services 128 or computer software stack 125 may comprise one or more stream processing services (not shown). For example, such stream processing services may be embodied using IBM® InfoSphere® stream processing platform, Twitter Storm stream processing, Ptolemy or Kepler stream processing software, or similar complex event processing (CEP) platforms, frameworks, or services, which may include the use of multiple such stream processing services (in parallel, serially, or operating independently). Some embodiments of the present disclosure may also be used in conjunction with a applications for electronic documentation, electronic records management, personal information security, data mining, and/or informational trend identification.

Figure 1B:
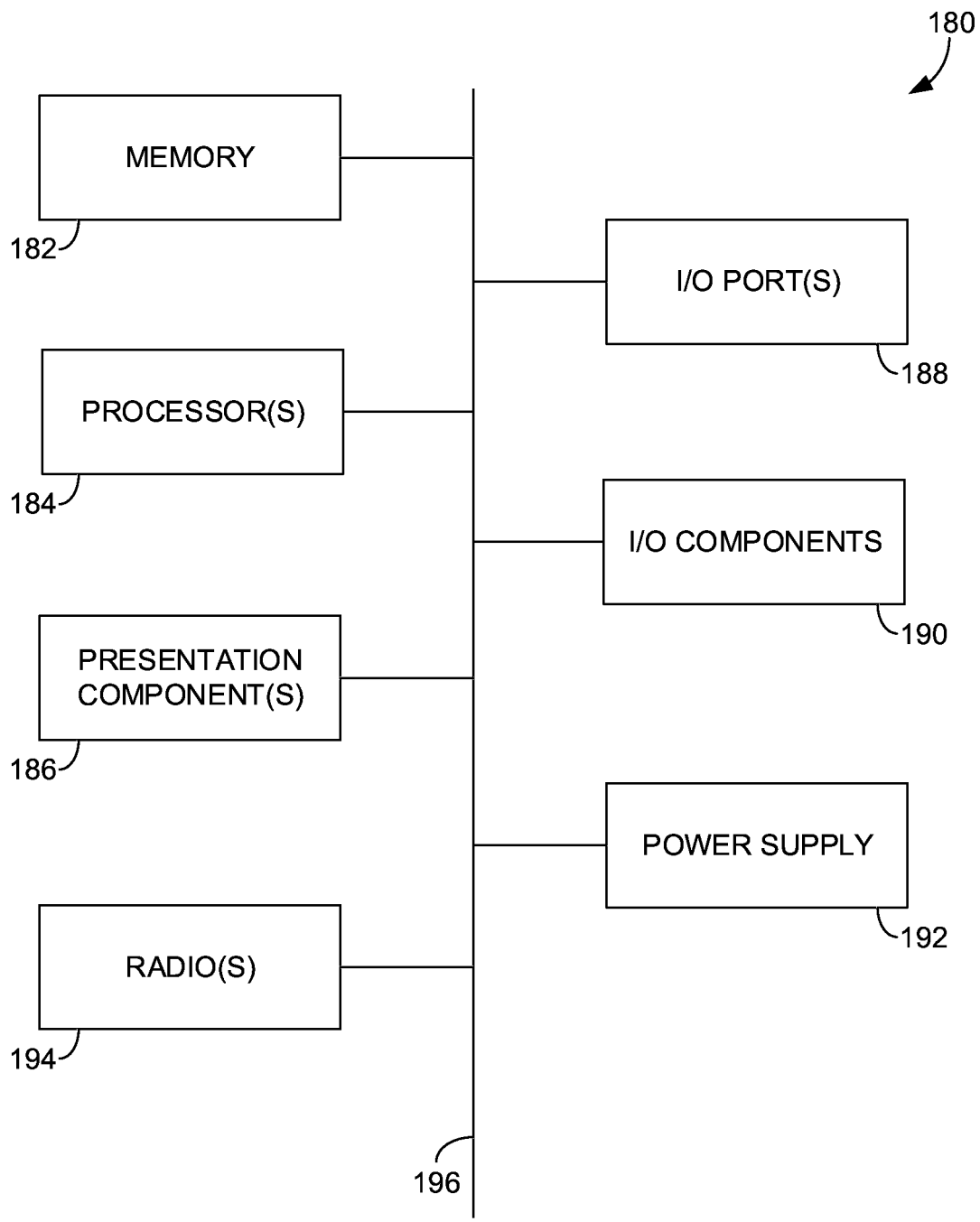

Referring to FIG. 1B, an example embodiment of computing system 180 representative of a system architecture that is suitable for computer systems, such as computer system 120 of FIG. 1A, is illustrated. Computing system 180 includes a bus 196 that directly or indirectly couples the following devices: memory 182, one or more processor(s) 184, one or more presentation component(s) 186, input/output (I/O) port(s) 188, input/output (I/O) components 190, radio(s) 194, and an illustrative power supply 192. Bus 196 represents what may be one or more busses (such as an address bus, data bus, or combination thereof). Although the various blocks of FIG. 1B are shown with lines for the sake of clarity, in reality, delineating various components is not so clear, and metaphorically, the lines would more accurately be grey and fuzzy. For example, one may consider a presentation component 186, such as a display device, to be an I/O component 190. Also, processors 184 have memory 182. As such, the diagram of FIG. 1B is merely illustrative of computing system 180 that can be used in connection with one or more embodiments of the present disclosure. Distinction is not made between such categories as "workstation," "server," "laptop," "hand-held device," etc., as all are contemplated within the scope of FIG. 1A and reference to "computing system" such as the computing system 180 in FIG. 1B.

Computing system 180 typically includes a variety of computer-readable media. Computer-readable media can be any available media that can be accessed by computing system 180 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules or other data. Computer storage media includes, but is not limited to, random-access memory (RAM), read-only memory (ROM), electrically erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by computing system 180. Computer storage media does not comprise signals per se. Communication media typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or a direct-wired connection, and wireless media, such as acoustic, radio frequency (RF), infrared and other wireless media. Combinations of any of the above should also be included within the scope of computer-readable media.

Memory 182 includes computer storage media in the form of volatile and/or nonvolatile memory. The memory 182 may be removable, non-removable, or a combination thereof. Examples of hardware devices include solid-state memory, hard drives, optical-disc drives, etc. Computing system 180 includes one or more processor(s) 184 that read data from various entities, such as memory 182 or I/O components 190. Presentation component(s) 186 present data indications to a user or other device. Examples of presentation component(s) 186 include a display device, a speaker, a printing component, a vibrating component, etc.

In some embodiments, computing system 180 comprises radio(s) 194 that facilitates communication with a wireless-telecommunications network. Illustrative wireless telecommunications technologies include code-division multiple access (CDMA), general packet radio system (GPRS), time-division multiple access (TDMA), global system for mobile communication (GSM), and the like. Radio 194 may additionally or alternatively facilitate other types of wireless communications including wireless fidelity (Wi-Fi), wireless inter-operability for microwave access (WiMAX), long term evolution (LTE), or other voice over internet protocol (VoIP) communications. As can be appreciated, in various embodiments, radio(s) 194 can be configured to support multiple technologies and/or multiple radios can be utilized to support multiple technologies.

I/O port(s) 188 allow computing system 180 to be logically coupled to other devices, including I/O components 190, some of which may be built in. Illustrative components include a microphone, a joystick, a game pad, a satellite dish, a scanner, a printer, a wireless device, etc. The I/O components 190 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing system 180. The computing system 180 may be equipped with depth cameras, such as stereoscopic camera systems, infrared camera systems, red, green, and blue (RGB) camera systems, touchscreen technology, and combinations of these, for gesture detection and recognition. Additionally, the computing system 180 may be equipped with accelerometers or gyroscopes that enable detection of motion.

The architecture depicted in FIG. 1B is provided as one example of any number of suitable computer architectures, such as computing architectures that support local, distributed, or cloud-based software platforms, and are suitable for supporting computer system 120.

Returning to FIG. 1A, in some embodiments, computer system 120 is a computing system made up of one or more computing devices. In some embodiments, computer system 120 includes one or more software agents and, in an embodiment, operating system 129 includes an adaptive multi-agent operating system, but it will be appreciated that computer system 120 may also take the form of an adaptive single agent system or a non-agent system. Computer system 120 may be a distributed computing system, a data processing system, a centralized computing system, a single computer, such as a desktop or laptop computer or a networked computing system.

Figure 2:
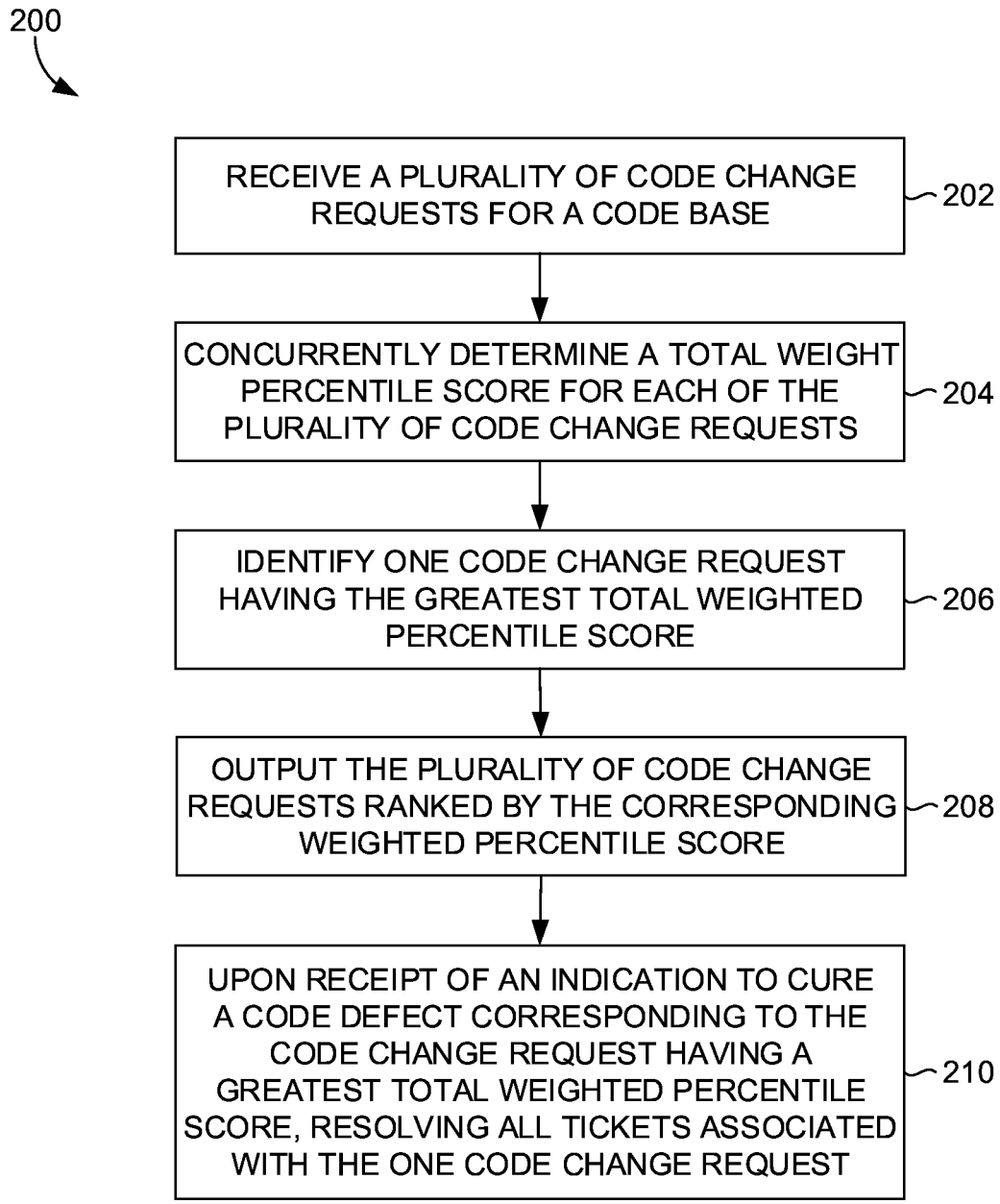
FIG. 2 is a flow chart of an example method for determining the prioritization of a plurality of code change requests, according to an aspect of the present disclosure.

Turning now to FIG. 2, an example embodiment of a method for determining the prioritization of a plurality of code change requests is provided and is referred to generally as method 200. In particular, the method 200 utilizes a set of factors along with pre-determined weighting value to determine the prioritization order of the plurality of code change requests. Each factor of the set of factors is assigned a unique and predefined weighting value that is specific to a particular factor. In some embodiments, the method 200 is suitable for implementation as a computer-performed method or via application 140, previously discussed.

At step 202, a plurality of code change requests for a code base is received, wherein the plurality of code change requests is associated with a plurality of submissions. In some examples, a submission is known as or may be referred to as a "ticket", wherein the ticket has been submitted to report a software product problem that corresponds to a code change in the code base for that software product. The plurality of code change requests corresponds to a plurality of submissions for one or more code bases. Each code change request may have one or more submissions reporting the same or similar software product problem, and/or requesting a specific code change to address the same or similar software product problem. Each client may be associated with the same code base or be associated with a unique code base. In some aspects, the code base for each client is unique and each submission requires a unique solution. In other aspects, an individual client for a system may submit multiple submissions where each is associated with the same code base but distinct code defects.

At step 204, a total weighted percentile score for each of the plurality of code change requests is concurrently determined, wherein the total weighted percentile score is determined using a plurality of factors, and wherein the total weighted percentile score is an indicator of code defect impact. For example, the plurality of code change requests may be received and are analyzed at the same time to determine the total weighted percentile score for each of the plurality of code change requests relative to one another and considering the submissions that correspond to each code change request. For each code change request, the percentile score is determined for each of a plurality of factors using information provided in the corresponding code change request itself and/or provided by the corresponding submissions, wherein the information defines values for each factor for the corresponding code change request. The percentile score is determined for each particular factor by multiplying the corresponding value defined for each particular factor in the corresponding code change request by the unique and predetermined weighting value that is specific to the particular factor. By concurrently determining the total weighted percentile score, the factors and weights, as described herein, are being evaluated in parallel. This in turn reduces processing time and provides an improvement in processing.

The factors analyzed to determine a weighted percentile score may be selected from the non-inclusive list of: a total number of submissions for each code change request; a total client count for the code change request; an obligation count for each code change request; a severity level; an average criticality; and a functionality of the current code. For these factors, a weighted percentile score is calculated. For the factor of "total number of submissions for each code change request", each code change request gets a weighted percentile score corresponding to the number of submissions that are associated with and/or linked to that code change request. The factor "a total client count" is calculated for each code change request based on the number of clients affected (submissions, or obligations received). The factor "obligation count" percentile score is calculated for each code change request based on the number of obligations logged against them.

The table 300 of FIG. 3 provides examples of the factor "severity level." The percentile score for the "severity level" factor is determined using a level assigned to the code change request, as generally based on corresponding submissions for which the software product problem is important (i.e., system crash). For example, a severity category of NULL 302, or "N/A" (i.e., non-applicable) 304 have a severity level of one and would have a low percentile score relative to other items. A severity category of Financial 322, Data Loss 320, or Outage 318 have severity levels of five and would have the highest percentile score relative to other severity categories. Severity categories of 4-Minor Error 306, Cosmetic 308, Patient Care 310, Performance 312, Technical 314, or Functional 316 would have moderate severity levels and thus a moderate percentile score relative to other severity categories. The severity category and severity level can be assigned by the application or by a user to each incoming submission and/or code change request.

The table 400 of FIG. 4 provides examples of the factor "average criticality." The average criticality factor percentile score is determined using a submission's criticality category and a criticality level that is assigned to each submission that is associated with the particular code change request. For example, a criticality category of "Critical" 402 has a criticality level of 8 and would have a high percentile score relative to other items. A criticality category of "High" 404 has a criticality level of 5 and would have a lower percentile score, relative to "Critical" 402. A criticality level of "Medium" 406 has a criticality level of 3 and would have a lower percentile score, relative to both "Critical" 402 and "High" 404. A criticality category of "Low" 408 has a criticality level of 2 and would have a lowest percentile score relative to the other items. The criticality category and criticality level can be assigned by the application, such as the application 140, or by a user to each incoming submission and/or to each code change request depending on implementation.

Returning to the method 200 of FIG. 2, at step 204, the total weighted percentile score for each code change request is calculated using the independent percentile scores mentioned above and multiplied with a corresponding "weightage" or "weighting value". The weightages for each of the factors may add to a sum of 100, and the weightage for each factor can be different or the same, in various aspects. In an embodiment, each of the weightages are pre-determined by a user such that the higher weightages are given to the number of clients affected with a defect and the criticality of tickets. These factors along with overall number of tickets may change the priority of the associated code change request. Though these recommended factors are based on qualitative and quantitative judgements, these are still open to change as per the needs of different solution stakeholders.

Once the weighted percentile score is determined for each factor for a corresponding code request being evaluated, each percentile score for each factor is added together to get a total weighted percentile score for that particular code change request. Each total weighted percentile score is indicative of the overall impact of the code defect for the software product problem associated with the submissions and corresponding code change request. For example, the logic can be formulated in the following formula:

Total weighted percentile score=$[(W_T*P_T)+(W_C*P_C)+(W_O*P_O)+(W_S*P_S)+(W_{CT}*P_{CT})+(W_P*P_P)]$; wherein:

$W_T$, $P_T$: Weightage & Percentile of factor "Submission Count";

$W_C$, $P_C$: Weightage & Percentile of factor "Client Count";

$W_O$, $P_O$: Weightage & Percentile of factor "Obligation Count";
$W_S$, $P_S$: Weightage & Percentile of factor "Severity";
$W_{CT}$, $P_{CT}$: Weightage & Percentile of factor "Average Criticality"; and
$W_P$, $P_P$: Weightage & Percentile of factor "Previously functional."

A prioritization example is provided in the below table:

| Ticket Count | Ticket Count Percentile | Ticket Count Weightage | Ticket Count SCORE |
| --- | --- | --- | --- |
| 15 | 0.919 | 20% | 18.385 |

| Client Count | Client Count Percentile | Client Count Weightage | Client Count SCORE |
| --- | --- | --- | --- |
| 11 | 0.954 | 20% | 19.083 |

| Obligation Count | Obligation Count Percentile | Obligation Count Weightage | Obligation Count SCORE |
| --- | --- | --- | --- |
| 11 | 0 | 20% | 0 |

| Severity | Severity Percentile | Severity Weightage | Severity SCORE |
| --- | --- | --- | --- |
| Functional | 0.137 | 10% | 1.374 |

| Avg. INC Criticality | Avg. INC Criticality Percentile | Avg. INC Criticality Weightage | Avg. INC Criticality SCORE |
| --- | --- | --- | --- |
| 2.4 | 0.474 | 20% | 9.48 |

In this example, the total weighted percentile score is: 18.385+19.083+0+1.374+9.48=48.322

Returning to the method 200 of FIG. 2, at step 206, the method 200 identifies one code change request having the greatest total weighted percentile score (relative to the other code change requests' total weight percentile scores that have lower values). This one code change request may be associated with a single code base or a single defect within a code base. Along with the identified greatest total percentile score, the rest of the plurality of received code change requests are ranked by total weighted percentile score. This provides an organized and ordered list that prioritizes the code change requests based on the impact of the underlying code defect. At step 208 of method 200, the plurality of ranked code change requests is output for display on a user device or a graphical user display where they are ranked by their corresponding total weighted percentile scores.

At step 210, the method 200 includes, in response to receiving an indication to cure a code defect that corresponds to the one code change request having the greatest/highest total weighted percentile score, all code change requests associated with the first code base are resolved (based on the code defect being cured in the code base). The resolution or "cure" of a code change request involves implementing a solution that fixes the underlying code defect reported via the submissions.

Among other things, a set of code change requests can be identified within the plurality of code change requests, where the set is associated with a first code defect in the plurality of code defects. In other words, all of the code change requests may be associated with the same code defect across one or more code bases. A system and/or a user may provide a solution to cure/resolve the highest ranked code change request. This solution being provided may then trigger an indication to cure the code defect associated with the code change request. The method 200 may, in some embodiments, identify all code change requests that relate to the same code base as the code base that is associated with the solved code change request. Some of the code change requests identified may be associated with a historical indication of a "cure" or "fix" that specifically addressed a particular code defect that was specific to a code change request, such as a software upgrade or driver installation package. The cure associated with them may be stored from past code change requests and remediation actions. A cure may be a change to the code base associated with the code change request that will fix or solve an issue, correct a problem, or provide an upgrade requested within the code change request. As such, once the cure for the code defect with the highest priority is identified and other related code change requests are identified, the identified cures for all code defects associated with the same code base can be implemented simultaneously.

Additionally, in response to receiving an indication to cure a code defect that corresponds to the code change request, resolving all code change requests submissions associated with the code change request. A development team may provide a solution to the highest ranked code change request that will then trigger an indication to cure the defect associated with that code change request. This code change request may have multiple submissions associated with it. By curing the code change request, the system (such as the computer system 120 or the computing system 180) or method (such as the method 200) will then resolve all submissions associated with that resolved code change request. Further, upon receiving an indication that at least one of the set of code change requests associated with the first code defect is cured, the method (such as the method 200) proceeds in correcting the first code defect for all remaining code change requests in the set of code change requests that are associated with the first code defect.

In some embodiments, the logic applied at step 210 can be implemented in one or more machine learning models. In embodiments, natural language processing is used to determine the similarity of one defect with any other defect. This is done by matching keywords that are related between two code change requests. In this way, this embodiment of step 210 may generate a more specific identification of code change requests that are related to the same code defect. This also aids developers to provide solutions for clusters of similar code change requests rather than individually.

Figure 5:
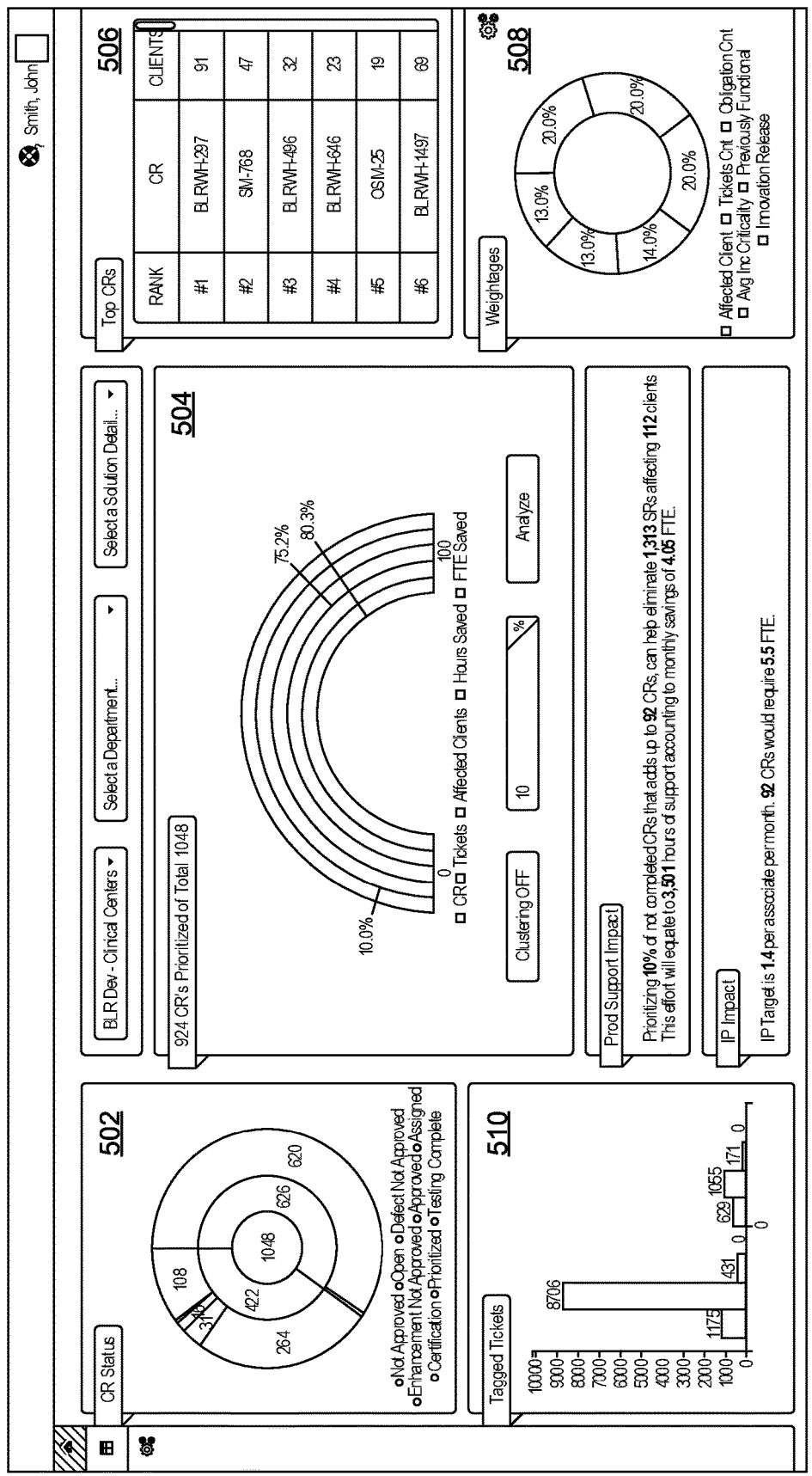
FIG. 5 illustrates an example graphical user interface configured to display information of a plurality of code change requests, according to an aspect of the present disclosure; and FIG. 6A to FIG. 6D illustrates example graphical user interfaces that displays information of the plurality of code change requests, according to various aspect of the present disclosure.

FIG. 5 depicts an example graphical user interface 500 that may be generated and presented on a user interface, such as user interface 142 in FIG. 1A, in response to prioritizing code change requests. The first portion 502 of the graphical user interface 500 provides a status of current change requests received. These code change request may be nonapproved, open, defect not approved, enhancement not approved, approved, assigned, certification, prioritized, or testing complete. By providing these indications for each code change request, the development team can track the progress of the code change requests. As indicated, portion 504 provides an indication of the total code change requests that have been prioritized. The portion 504 also allows a user to toggle on or off the clustering function. By turning the clustering function on, a backend machine learning tool will scan all of the open code change request for similarity to other open or resolved code change requests and cluster them together. Portion 504 with clustering ON will then be able to display for every code change request resolved, how many more code change requests can be resolved with minimal effort.

Portion 506 of the graphical user interface 500 depicts a display of a ranked order of open code change requests. This ranked order of open code change requests may be updated as additional code change requests are received. Portion 508 depicts a modifiable weightages selection tool, such as affected client, tickets client, obligation client, average Inc criticality, previously functional, and innovation release. This tool allows the user to modify the weightages for each factor and modify what factors are used. Portion 510 depicts the number of tagged submissions/tickets.

FIG. 6A to FIG. 6D depicts an example graphical user interface component 600 that may be generated and presented on a user interface, such as user interface 142 in FIG. 1A, in response to prioritizing code change requests. Portion 602 depicts a list of received code change requests. The list may include information about the code change request such as a request number, a priority level, a rank, total weighted percentile score, a severity, a status, a sub-status, among other things. The status indicated may be open, approved, not approved, or closed. The sub-status may be approved, assigned, defect not approved, etc.

Figure 6A:
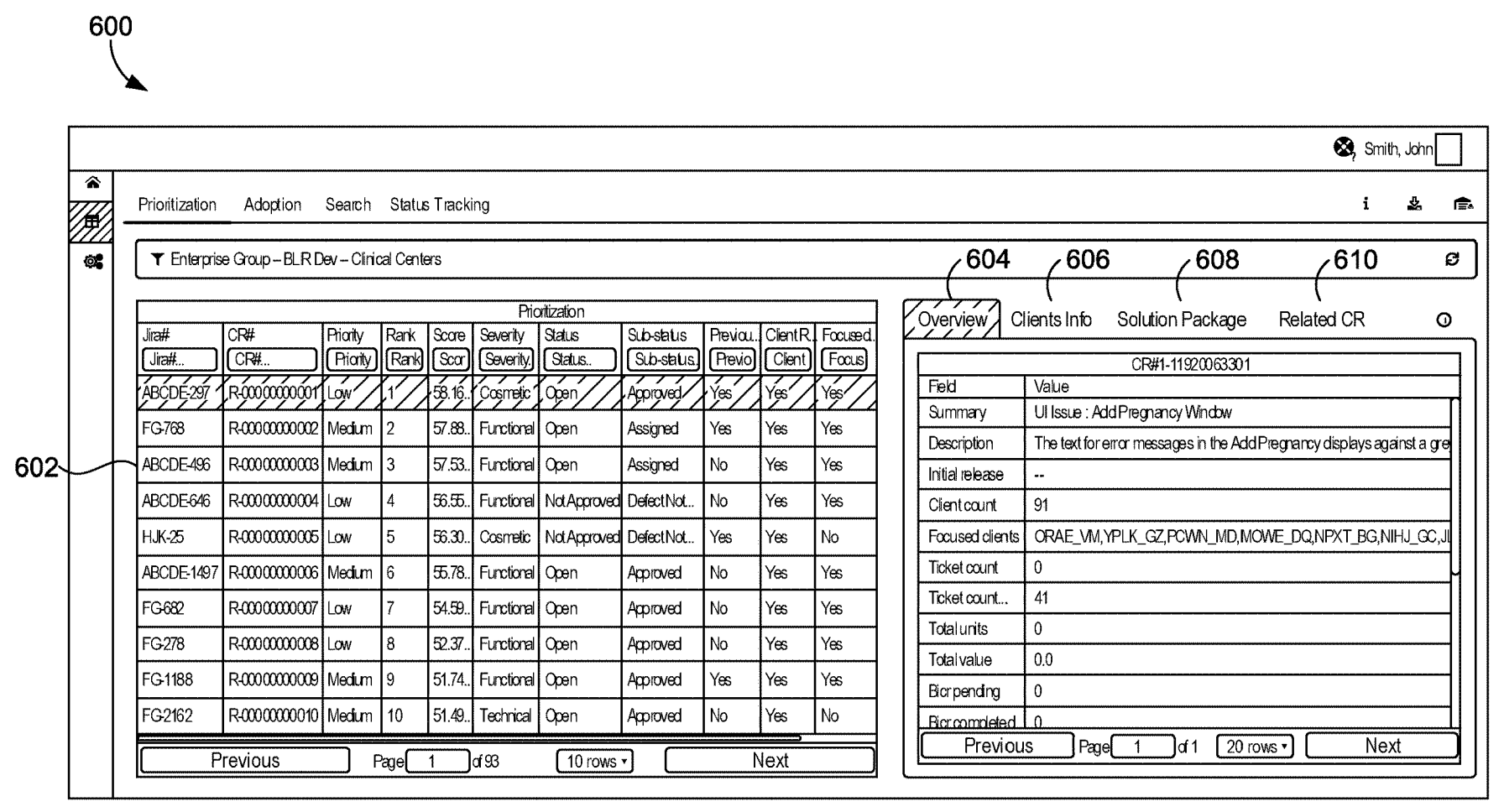
Figure 6B:
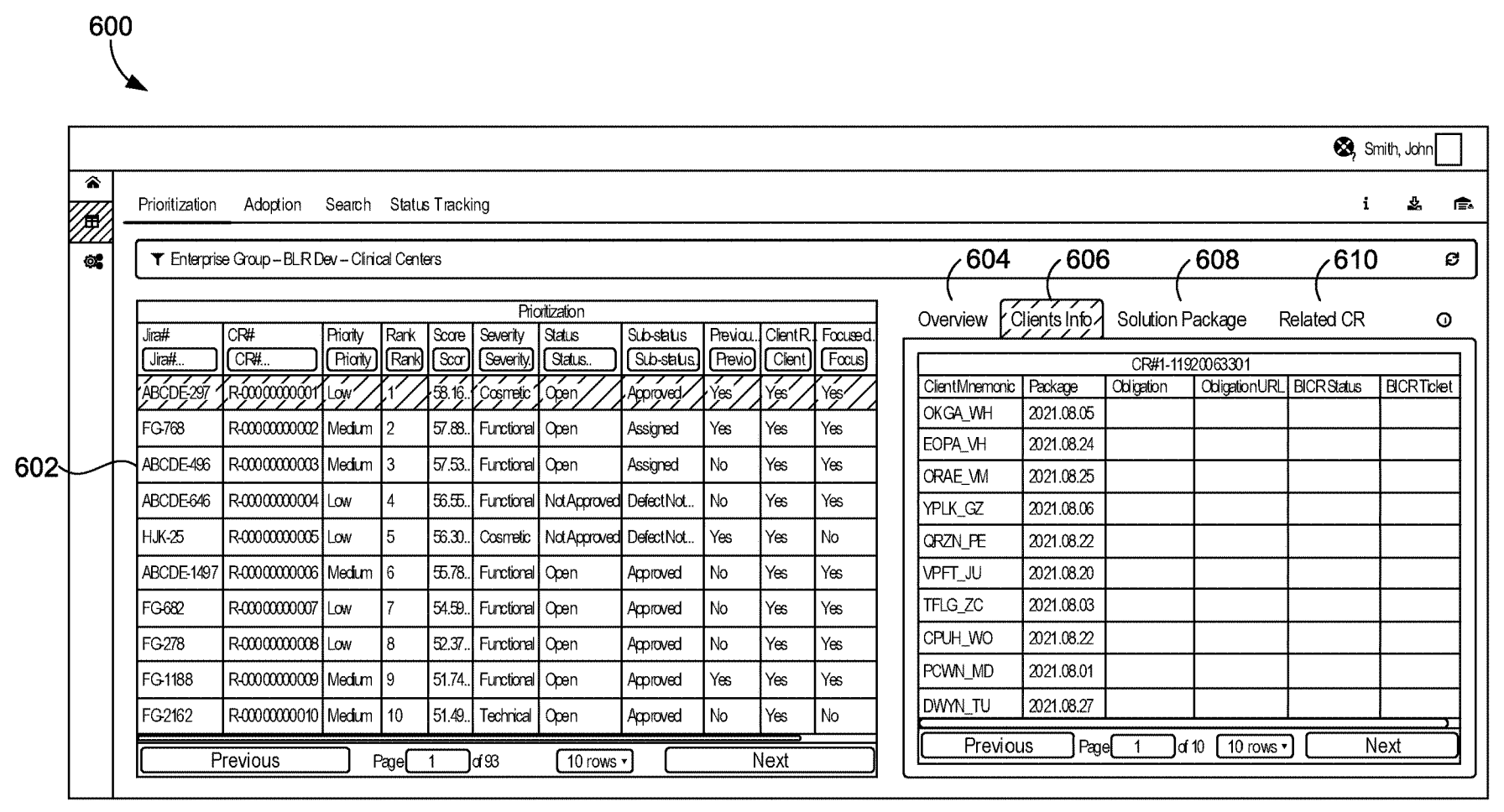
Figure 6C:
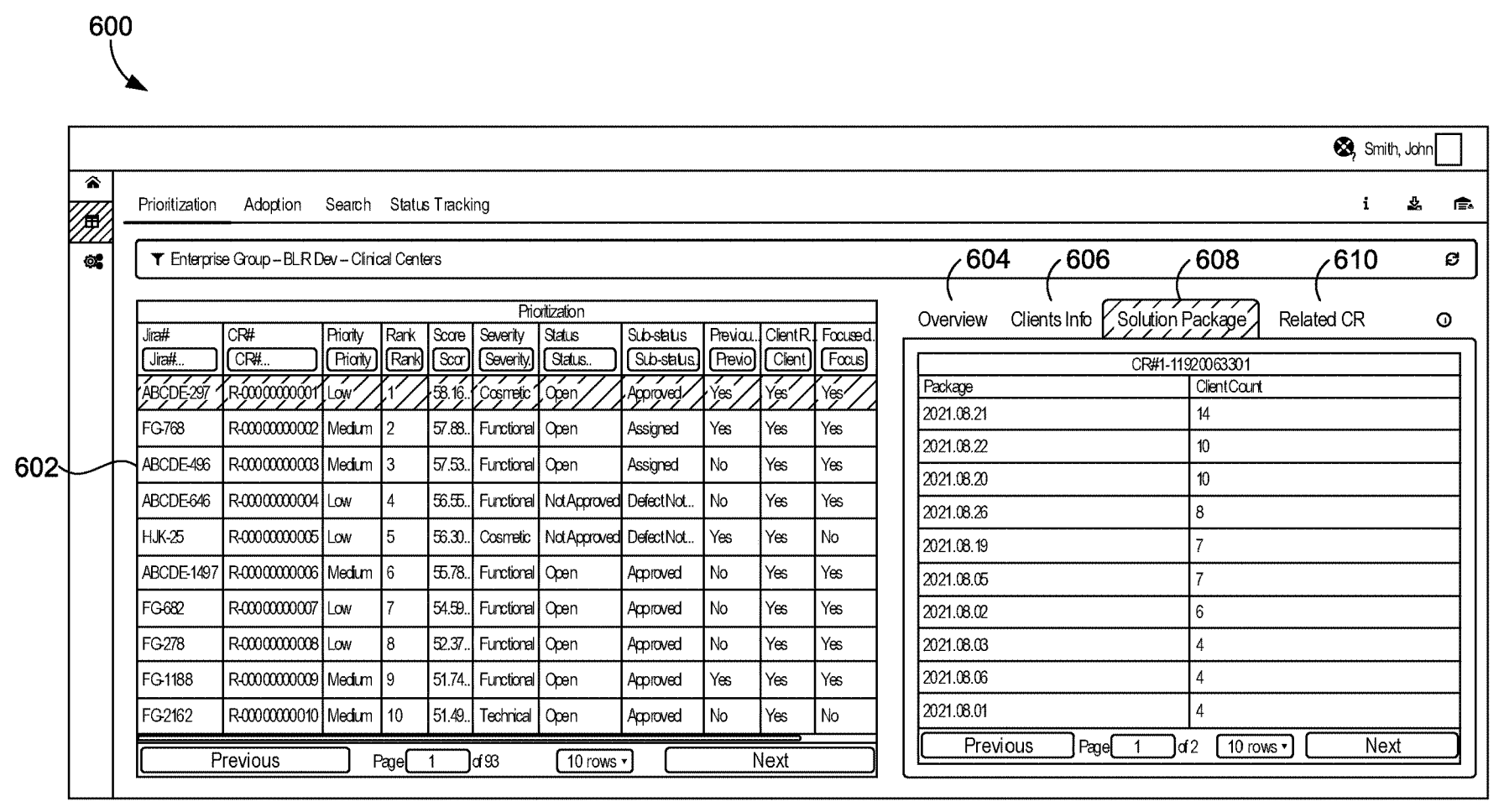
Figure 6D:
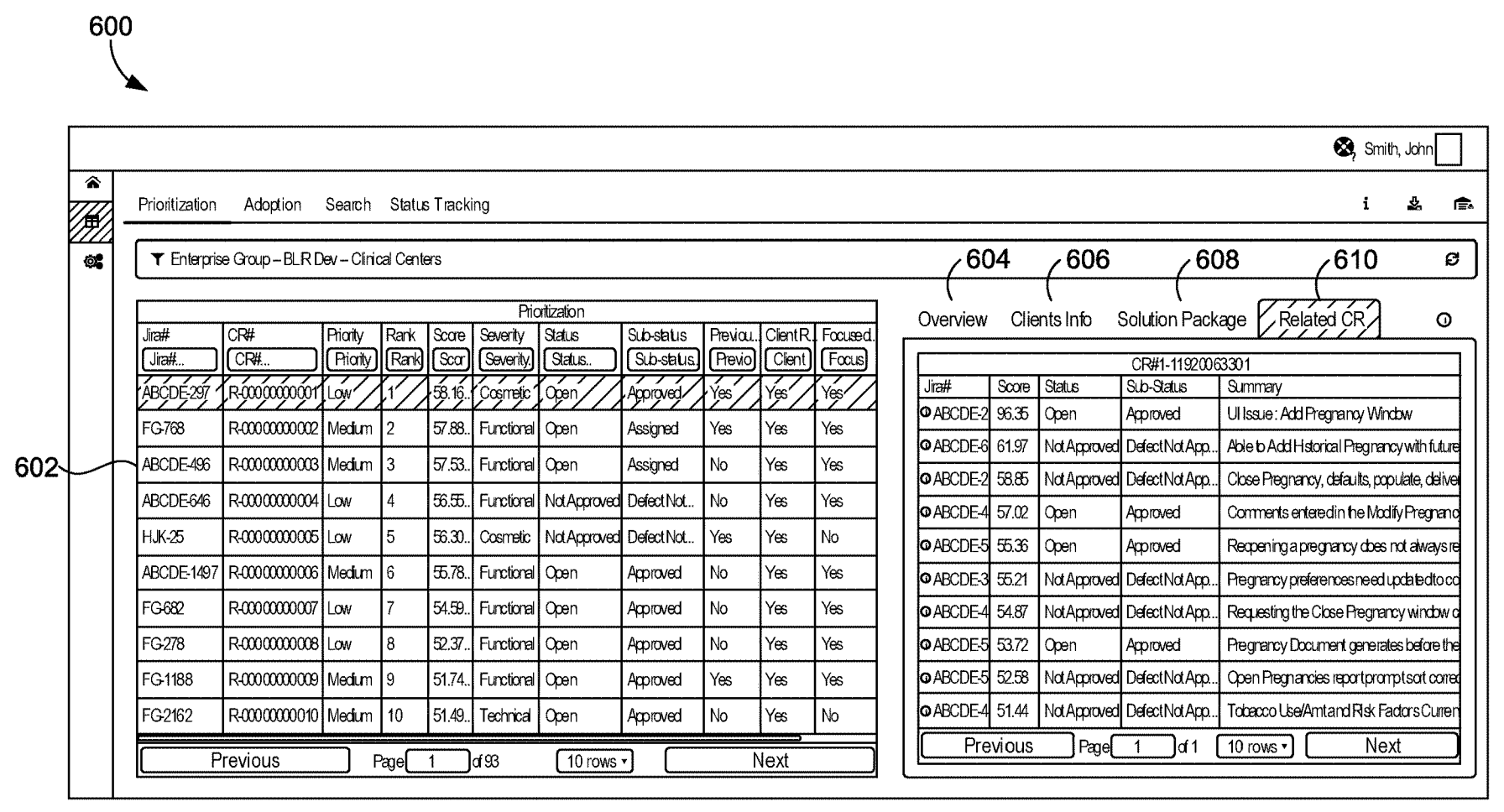

Tab overview portion 604 of FIG. 6A provides a more detailed description of the selected code change request. For example, code change request 1-11920063301 is selected and a detailed description of the code change request is provided under tab overview portion 604. Tab portion 606 of FIG. 6B provides additional information regarding the client's information. Tab portion 608 of FIG. 6C provides information regarding which solution package that is implemented is affecting the code base. This provides an insight as to which particular solutions have been used in the past for the particular code base(s). Tab portion 610 of FIG. 6D provides related code change requests, their status, and a summary of the code change request that is similar.

Many different arrangements of the various components depicted, as well as components not shown, are possible without departing from the spirit and scope of the present disclosure. It will be understood that certain features and sub-combinations are of utility and may be employed without reference to other features and sub-combinations and are contemplated within the scope of the claims. Not all steps listed in the various figures need be carried out in the specific order described. Accordingly, the scope of the present disclosure is intended to be limited only by the following claims.

What is claimed is:
1. A computer-implemented method, comprising:
receiving a plurality of code change requests associated with: a plurality of submissions and one or more code defects in one or more code bases;
concurrently determining a total weighted percentile score for each of the plurality of code change requests, wherein the total weighted percentile score is determined using a plurality of factors associated with a total submission count, a total client count, an obligation count, an average criticality, or a previously functional code base, and wherein the total weighted percentile score is an indicator of code defect impact;
identifying a first code change request having a greatest total weighted percentile score within the plurality of code change requests;
outputting the plurality of code change requests to a user device to display;
receiving an indication of a cure that has been implemented for a particular code defect that corresponds to the first code change request having the greatest total weighted percentile score within the plurality of code change requests;
inputting characteristics and prioritization factors of the plurality of code change requests to a machine learning model to identify a set of similar code change requests, from the plurality of code change requests, that correspond to the same particular code defect as the first code change request; and
responsive to determining that the particular code defect has been cured: automatically resolving, based on the cure, the set of similar code change requests in response to determining that the set of similar code change requests correspond to the same particular code defect.

2. The computer-implemented method of claim 1, wherein the plurality of code change requests is associated with a plurality of code defects.

3. The computer-implemented method of claim 1, wherein the plurality of factors is associated with two or more of the total submission count, the total client count, the obligation count, the average criticality, or the previously functional code base.

4. The computer-implemented method of claim 1, further comprising: receiving an indication that a second code defect differing from the particular code defect has been cured, and resolving the second code defect for all remaining code change requests in a second set of one or more similar code change requests that are associated with the second code defect.

5. The computer-implemented method of claim 1, wherein each factor of the plurality of factors is assigned a unique and predefined weighting value that is specific to the particular factor.

6. The computer-implemented method of claim 5, wherein, for each code change request of the plurality of code change requests, a percentile score is determined for each particular factor of the plurality of factors using information provided in the corresponding cod change request, and wherein the information defines values for each particular factor for the corresponding code change request.

7. The computer-implemented method of claim 6, wherein the percentile score is determined for each particular factor by multiplying a corresponding value defined for each particular factor in the corresponding code change request by the unique and predetermined weighting value that is specific to the particular factor.

8. The computer-implemented method of claim 1, wherein at least one of the prioritization factors of the plurality of code change requests comprise a severity associated with each of the plurality of code change requests.

9. One or more non-transitory computer storage media storing computer-useable instructions that, when used by one or more computing devices, cause the one or more computing devices to initiate operations comprising:
receiving a plurality of code change requests associated with: a plurality of submissions and one or more code defects in one or more code bases;
concurrently determining a total weighted percentile score for each of the plurality of code change requests, wherein the total weighted percentile score is determined using a plurality of factors associated with a total submission count, a total client count, an obligation count, an average criticality, or a previously functional code base, and wherein the total weighted percentile score is an indicator of code defect impact;
identifying a first code change request having a greatest total weighted percentile score within the plurality of code change requests;
outputting the plurality of code change requests to a user device to display;
receiving an indication of a cure that has been implemented for a particular code defect that corresponds to the first code change request having the greatest total weighted percentile score within the plurality of code change requests;
inputting characteristics and prioritization factors of the plurality of code change requests to a machine learning model to identify a set of similar code change requests, from the plurality of code change requests, that correspond to the same particular code defect as the first code change request;
responsive to determining that the particular code defect has been cured: automatically resolving, based on the cure, the set of similar code change requests in response to determining that the set of similar code change requests correspond to the same particular code defect.

10. The one or more non-transitory computer storage media of claim 9, wherein the plurality of code change requests is associated with a plurality of code defects.

11. The one or more non-transitory computer storage media of claim 9, wherein the plurality of factors is associated with two or more of the total submission count, the total client count, the obligation count, the average criticality, or the previously functional code base.

12. The one or more non-transitory computer storage media of claim 9, wherein the operations further comprise: receiving an indication that a second code defect differing from the particular code defect has been has been cured, and resolving the second code defect for all remaining code change requests in a second set of code change requests that are associated with the second code defect.

13. The one or more non-transitory computer storage media of claim 9, wherein each factor of the plurality of factors is assigned a unique and predefined weighting value that is specific to the particular factor.

14. The one or more non-transitory computer storage media of claim 13, wherein, for each code change request of the plurality of code change requests, a percentile score is determined for each particular factor of the plurality of factors using information provided in the corresponding code change request, and wherein the information defines values for each particular factor for the corresponding code change request.

15. The one or more non-transitory computer storage media of claim 14, wherein the percentile score is determined for each particular factor by multiplying the corresponding value defined for each particular factor in the corresponding code change request by the unique and predetermined weighting value that is specific to the particular factor.

16. A system, comprising:
one or more processors; and
one or more computer storage media storing instructions that, when used by the one or more processors, cause the one or more processors to initiate:
receiving a plurality of code change requests associated with: a plurality of submissions and one or more code defects in one or more code bases;
concurrently determining a total weighted percentile score for each of the plurality of code change requests, wherein the total weighted percentile score is determined using a plurality of factors associated with a total submission count, a total client count, an obligation count, an average criticality, or a previously functional code base, and wherein the total weighted percentile score is an indicator of code defect impact;
identifying a first code change request having a greatest total weighted percentile score within the plurality of code change requests;
outputting the plurality of code change requests to a user device to display;
receiving an indication of a cure that has been implemented for a particular code defect that corresponds to the first code change request having the greatest total weighted percentile score within the plurality of code change requests;
inputting characteristics and prioritization factors of the plurality of code change requests to a machine learning model to identify a set of similar code change requests, from the plurality of code change requests, that correspond to the same particular code defect as the first code change request;
responsive to determining that the particular code defect has been cured: automatically resolving, based on the cure, the set of similar code change requests in response to determining that the set of similar code change requests correspond to the same particular code defect.

17. The system of claim 16, wherein, for each code cod change request of the plurality of code change requests, a percentile score is determined for each particular factor of the plurality of factors using information provided in the corresponding code change request, and wherein the information defines values for each particular factor for the corresponding code change request.

18. The system of claim 17, wherein the percentile score is determined for each particular factor by multiplying the corresponding value defined for each particular factor in the corresponding code change request by the unique and predetermined weighting value that is specific to the particular factor.

19. The system of claim 16, wherein at least one of the prioritization factors of the plurality of code change requests comprise a severity associated with each of the plurality of code change requests.

20. The system of claim 16, wherein the plurality of factors is associated with two or more of the total submission count, the total client count, the obligation count, the average criticality, or the Previously functional code base.

* * * * *